(12) United States Patent
Kohlberger

(10) Patent No.: US 10,479,179 B2
(45) Date of Patent: Nov. 19, 2019

(54) METHOD FOR OPERATING A RECHARGEABLE BATTERY CELL AND BATTERY CONTROL DEVICE

(71) Applicant: Robert Bosch GmbH, Stuttgart (DE)

(72) Inventor: Markus Kohlberger, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 134 days.

(21) Appl. No.: 15/574,605

(22) PCT Filed: Apr. 28, 2016

(86) PCT No.: PCT/EP2016/059459
§ 371 (c)(1),
(2) Date: Nov. 16, 2017

(87) PCT Pub. No.: WO2016/184654
PCT Pub. Date: Nov. 24, 2016

(65) Prior Publication Data
US 2018/0154756 A1    Jun. 7, 2018

(30) Foreign Application Priority Data

May 19, 2015    (DE) .................. 10 2015 209 131

(51) Int. Cl.
| | |
|---|---|
| *H01M 10/44* | (2006.01) |
| *H01M 10/46* | (2006.01) |
| *B60K 6/28* | (2007.10) |
| *H01M 10/48* | (2006.01) |
| *H02J 7/04* | (2006.01) |
| *H01M 10/0525* | (2010.01) |
| *H02J 7/00* | (2006.01) |

(52) U.S. Cl.
CPC .............. *B60K 6/28* (2013.01); *H01M 10/44* (2013.01); *H01M 10/482* (2013.01); *H02J 7/045* (2013.01); *H01M 10/0525* (2013.01); *H02J 2007/0037* (2013.01)

(58) Field of Classification Search
CPC ......... H02J 2007/0037; H02J 2007/004; H02J 7/007; H02J 2007/0095
USPC ..................... 302/104, 107, 128, 135, 136
See application file for complete search history.

(56) References Cited

FOREIGN PATENT DOCUMENTS

| | | |
|---|---|---|
| DE | 102007042578 A1 | 3/2009 |
| DE | 102010004216 A1 | 7/2011 |
| DE | 102012005563 A1 | 9/2013 |
| DE | 102013204346 | 9/2014 |
| JP | 2005080347 | 3/2005 |
| JP | 2007174867 | 7/2007 |
| JP | 2012200048 | 10/2012 |
| WO | 2014057802 | 4/2014 |

OTHER PUBLICATIONS

Machine translation JP 2005-080347 (Mar. 4, 2005) (Year: 2005).*
International Search Report for Application No. PCT/EP2016/059459 dated Jul. 20, 2016 (English Translation, 2 pages).

* cited by examiner

*Primary Examiner* — Edward Tso
(74) *Attorney, Agent, or Firm* — Michael Best & Friedrich LLP

(57) ABSTRACT

The invention relates to a method for operating a rechargeable battery cell: wherein —a first measurement (101) of a first voltage of the battery cell is carried out, —a first comparison (102) of the first voltage with a first limit voltage is carried out, —a charging process (104) of the battery cell is carried out if the first voltage is less than the first limit voltage, —a second measurement (106) of a second voltage of the battery cell is carried out, —a second comparison (107) of the second voltage with a second limit voltage is carried out, —a discharge process (109) of the battery cell is carried out if the second voltage is greater than the second limit voltage, wherein the first limit voltage is greater than the second limit voltage. The invention also relates to a battery control device which is equipped to carry out the method according to the invention.

9 Claims, 2 Drawing Sheets

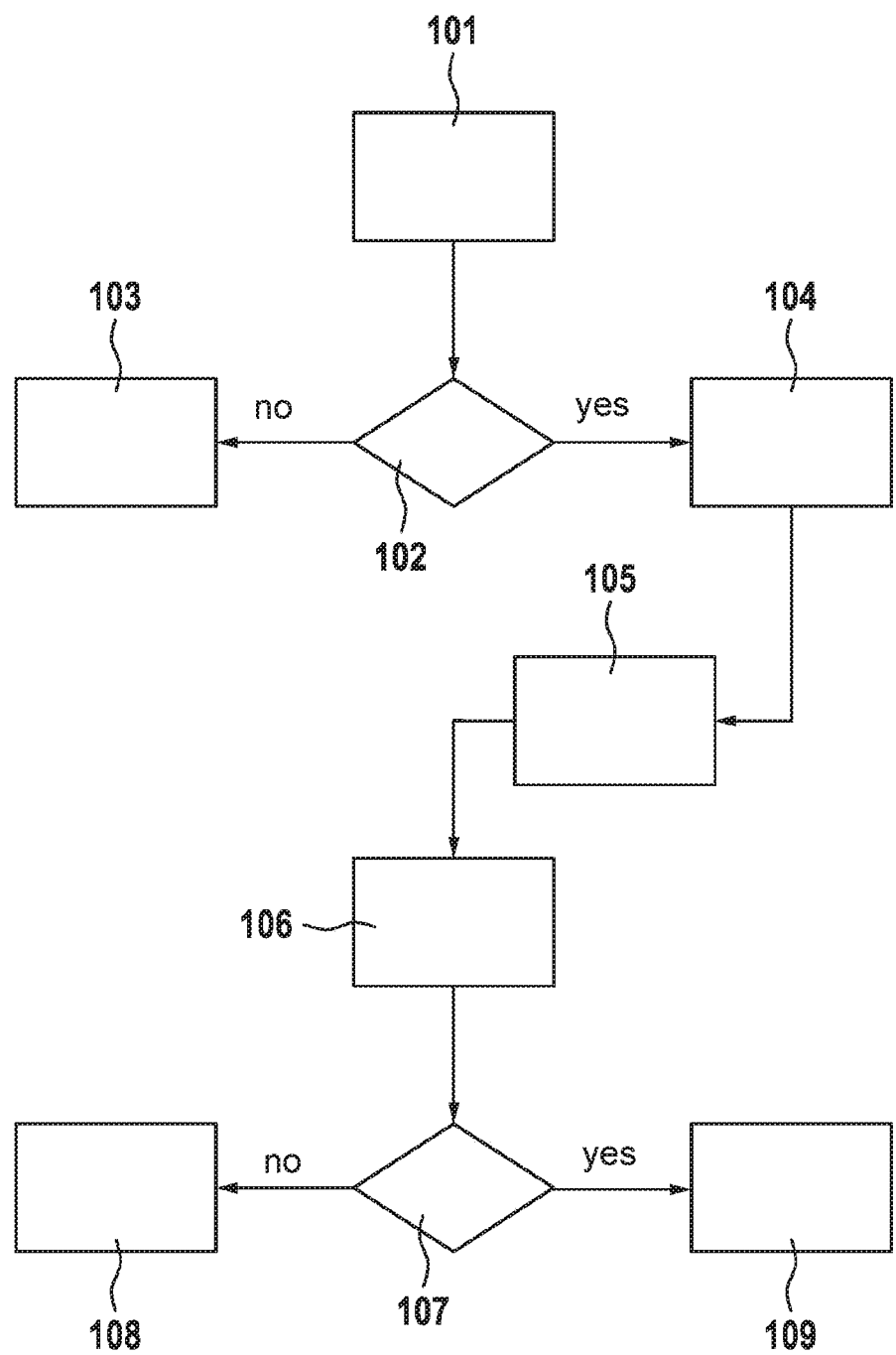

METHOD FOR OPERATING A RECHARGEABLE BATTERY CELL AND BATTERY CONTROL DEVICE

BACKGROUND OF THE INVENTION

The invention relates to a method for operating a rechargeable battery cell, in particular a lithium-ion battery cell. The invention also relates to a battery control device.

Electric energy can be stored by means of batteries. Batteries convert chemical reaction energy into electric energy. Primary batteries and secondary batteries are differentiated here. Primary batteries are only functional once, whereas secondary batteries, which are also referred to as accumulators, can be recharged. A battery thereby comprises one or a plurality of battery cells.

Particularly so-called lithium-ion battery cells are used in an accumulator. These are characterized inter alia by high energy densities, thermal stability and an extremely low self-discharge. Lithium-ion batteries are used inter alia in motor vehicles, particularly in electric vehicles (EV), hybrid vehicles (hybrid electric vehicle, HEV) as well as in plug-in hybrid vehicles (plug-in hybrid electric vehicle, PHEV).

Lithium-ion battery cells have a positive electrode, which is also referred to as cathode, and a negative electrode, which is also referred to as anode. The cathode and the anode each comprise a current collector, to which an active material is applied. An active material for the cathode relates, for example, to a metal oxide. The active material for the anode relates, for example, to silicon; however, graphite is also widely used as the active material for anodes.

Lithium atoms are embedded in the active material of the anode. During operation of the battery cell, i.e. during a discharge process, electrons flow in an external circuit from the anode to the cathode. During a discharge process, lithium ions travel within the battery cell from the anode to the cathode. In so doing, the lithium ions are reversibly deintercalated from the active material of the anode, which is also referred to as delithiation. During a charging process of the battery cell, the lithium ions travel from the cathode to the anode. In so doing, the lithium ions again reversibly intercalate into the active material of the anode, which is also referred to as lithiation.

The electrodes of the battery cell are designed in a foil-like manner and are wound with interposition of a separator, which separates the anode from the cathode, to an electrode winding. Such an electrode winding is also referred to as jelly roll. The electrodes can also be superposed to form an electrode stack.

The two electrodes of the electrode winding or the electrode stack are connected electrically to poles of the battery cell, which are also referred to as terminals, by means of collectors. A battery cell generally comprises one or a plurality of electrode windings or the electrode stack. The electrodes and the separator are usually surrounded by a liquid electrolyte. The electrolyte is conductive for the lithium ions and enables the transport of the lithium ions between the electrodes.

By construction, each battery cell has a limit voltage. Slightly exceeding the limit voltage during a charging process can lead to a faster ageing of the battery cell. Strongly exceeding the limit voltage during a charging process can lead to the battery cell overheating in combination with a fire or an explosion.

A method for charging as well as equalizing of chargeable battery modules is, for example, known from the German patent application DE 10 2013 204 346 A1.

A method for operating, particularly charging and discharging a chargeable battery in a vehicle is disclosed in the Japanese patent application JP 2012-2000048 A.

A method for operating battery cells, in particular for charging battery cells by means of recuperation, in a vehicle is known from the WIPO patent application WO 2014/057802.

SUMMARY OF THE INVENTION

A method for operating a rechargeable battery cell is proposed, wherein
- a first measurement of a first voltage of the battery cell is carried out,
- a first comparison of the first voltage with a first limit voltage is carried out,
- a charging process of the battery cell is carried out if the first voltage is less than the first limit voltage,
- a second measurement of a second voltage of the battery cell is carried out,
- a second comparison of the second voltage with a second limit voltage is carried out,
- a discharge process of the battery cell is carried out if the second voltage is greater than the second limit voltage.

The first limit voltage is greater than the second limit voltage. The second limit voltage thereby corresponds to the typical operating voltage or to the typical nominal voltage of the battery cell.

The battery cell relates particularly to a lithium-ion battery cell. The method according to the invention can, however, also be applied to other types of battery cells.

A charging of the battery cell is discontinued if the first voltage is greater than or equal to the first limit voltage. As a result, an overheating of the battery cell is prevented.

A discharging of the battery cell is discontinued if the second voltage is less than or equal to the second limit voltage. This especially occurs if energy is extracted by a load, whereby the voltage of the battery cell sinks, immediately after the charging process which led to an overcharge of the battery cell.

A waiting period is advantageously provided between the charging process and the second measurement. The waiting period lies preferably in a range of a plurality of milliseconds up to a few seconds. Said waiting period specifies how long a short-term overcharging of the battery can last.

In the case of a commercial lithium-ion battery cell, the first limit voltage is between 4.3 volts and 4.35 volts. In the case of a commercial lithium-ion battery cell, the second limit voltage is preferably between 4.15 volts and 4.2 volts. The first limit voltage is thus greater than the second limit voltage.

The method according to the invention can be used particularly advantageously in a vehicle. The charging process takes place by means of recuperation particularly in a vehicle. That means, during a braking process of the vehicle, the braking energy is converted into electric energy and fed back into the battery cell. Other applications for the method according to the invention are, however, also conceivable.

A battery control device is also proposed, which is equipped to carry out the method according to the invention.

A battery control device according to the invention is advantageously used in an electric vehicle (EV), in a hybrid vehicle (HEV) or in a plug-in hybrid vehicle (PHEV).

The method according to the invention allows for a short-term overcharging of a battery cell. As a result, it is possible to still store energy made available by recuperation, which otherwise would be lost, in an actually fully charged battery cell. The electric energy made available by recuperation can thereby be better used and losses are kept to a minimum.

Electric energy generated in a vehicle during a braking operation can especially be fed back, which leads to a short-term overcharging of the battery cell. Immediately after the battery cell has been overcharged, the energy which was fed back can be used to accelerate the vehicle.

By means of the method according to the invention, at most the battery cell is overcharged for a short time. Such a short-term overcharging of the battery cell is not critical for said battery cell and particularly does not accelerate the ageing of said cell. By means of the method according to the invention, only an overcharging of the battery cell is furthermore possible up to a predefined voltage, whereby an overheating, in particular in combination with a fire or an explosion, is ruled out.

BRIEF DESCRIPTION OF THE DRAWINGS

Embodiments of the invention are explained in greater detail with the aid of the drawings and the subsequent description.

In the drawings:

FIG. 2 shows steps of a method for operating the battery cell from FIG. 1.

DETAILED DESCRIPTION

Figure 1:
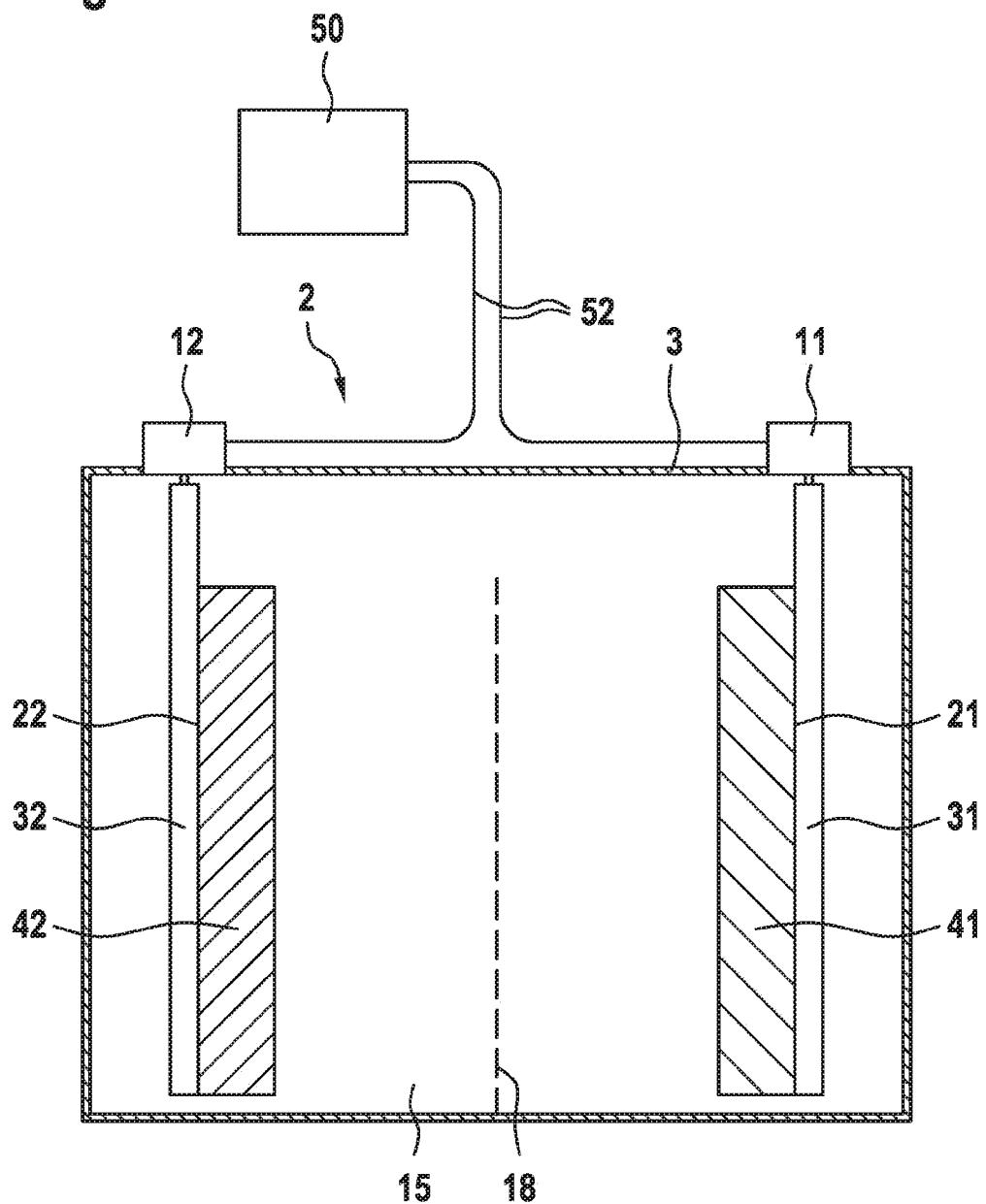
FIG. 1 shows a schematic depiction of a rechargeable battery cell.

A battery cell 2 is schematically depicted in FIG. 1. The battery cell 2 relates to a lithium-ion battery cell in the present example.

The battery cell 2 comprises a cell housing 3, which is designed prismatically, here cuboid. The cell housing 3 is configured to be electrically conductive and is, for example, made from aluminum. The cell housing 3 can, however, also be made from an electrically insulating material, for example plastic.

The battery cell 2 comprises a negative terminal 11 and a positive terminal 12. A voltage made available by the battery cell 2 can be tapped via the terminals 11, 12. In addition, the battery cell 2 can also be charged via the terminals 11, 12. The terminals 11, 12 are spaced apart from one another and are arranged on a cover surface of the prismatic cell housing 3.

An electrode winding, which has two electrodes, namely an anode 21 and a cathode 22, is arranged within the cell housing 3 of the battery cell 2. The anode 21 and the cathode 22 are in each case embodied in a foil-like manner and wound with the interposition of a separator 18 to form the electrode winding. It is also conceivable that a plurality of electrode windings is provided in the cell housing 3. Instead of the electrode winding, an electrode stack can also, for example, be provided.

The anode 21 comprises an active material 41, which is of foil-like design. The anodic active material 41 has silicone or an alloy containing silicon as a base material. The anode 21 further comprises a current collector 31, which is likewise of foil-like design. The anodic active material 41 and the current collector are laid flat to one another and are connected to one another.

The current collector 31 of the anode 21 is designed to be electrically conductive and is made from a metal, for example from copper. The current collector 31 of the anode 21 is electrically connected to the negative terminal 11 of the battery cell 2.

The cathode 22 comprises a cathodic active material 42, which is of foil-like design. The cathodic active material 42 has a metal oxide as base material, for example lithium-cobalt oxide ($LiCoO_2$). The cathode further comprises a current collector 32, which is likewise of foil-like design. The cathodic active material 42 and the current collector 32 are laid flat to one another and are connected to one another.

The current collector 32 of the cathode 22 is designed to be electrically conductive and is made from a metal, for example from aluminum. The current collector 32 of the cathode 22 is electrically connected to the positive terminal 12 of the battery cell 2.

The anode 21 and the cathode 22 are separated from one another by the separator 18. The separator 18 is likewise of foil-like design. The separator 16 is designed to be electrically insulating but ionically conductive, i.e. is permeable for lithium ions.

The cell housing 3 of the battery cell 2 is filled with a liquid electrolyte 15 or with a polymer electrolyte. The electrolyte 15 thereby surrounds the anode 21, the cathode 22 and the separator 18. The electrolyte 15 is also ionically conductive.

A battery control device 50 is connected to the battery cell 2 by means of a charging cable 52. The charging cable 52 has two strands, wherein a first strand is electrically connected to the negative terminal 11, and a second strand is connected to the positive terminal 12.

FIG. 2 shows steps of a method for operating the battery cell 2 which is depicted in FIG. 1 and embodied as a lithium-ion battery cell.

In a first step, a first measurement 101 of a first voltage U1 of the battery cell 2 is carried out. The first measurement 101 of the first voltage U1 is carried out by a voltage measuring unit of the battery control device 50 via the charging cable 52 connected to the terminals 11, 12 of the battery cell 2.

In a second step, a first comparison 102 of the first voltage U1 with a first limit voltage Umax1 is carried out. The first comparison 102 of the first voltage U1 with the first limit voltage Umax1 is carried out by a comparison unit of the battery control device 50.

If the first voltage U1 is greater than or equal to the limit voltage Umax1, a termination 103 of a charging of the battery cell 2 is carried out. In the present embodiment, the first limit voltage is between 4.3 volts and 4.35 volts.

If the first voltage U1 is less than the first limit voltage Umax1, a charging process 104 of the battery cell 2 is carried out in a following step. The charging process 104 of the battery cell 2 takes place here by means of recuperation.

After a waiting period 105, a second measurement 106 of a second voltage U2 of the battery cell 2 is carried out. The second measurement 106 of the second voltage U2 is likewise carried out by the voltage measuring unit of the battery control device 50 via the charging cable 52 which is connected to the terminals 11, 12 of the battery cell 2.

In a subsequent step, a second comparison 107 of the second voltage U2 with a second limit voltage Umax2 is carried out. The second comparison 107 of the second voltage U2 with the second limit voltage Umax2 is likewise carried out by the comparison unit of the battery control device. In the present embodiment, the second limit voltage Umax2 is between 4.15 volts and 4.2 volts.

If the second voltage U2 is greater than the second limit voltage Umax2, a discharge process 109 of the battery cell is carried out in a following step. The discharge process 109 is controlled by the battery control device by a discharge resistor or balancing resistor being connected between the terminals 11, 12 of the battery cell 2. As a result, a discharge current flows from the battery cell 2 through the discharge resistor, whereby the battery cell 2 is discharged.

If the second voltage U2 is less than or equal to the second limit voltage Umax2, a termination 108 of a discharge of the battery cell 2 is carried out. The battery cell 2 is again in a usual charging state and a further discharge is not required.

The invention is not limited to the exemplary embodiments described here and the aspects emphasized therein. On the contrary, a multiplicity of modifications, which lies within the scope of the action taken by a person skilled in the art, is possible within the range specified by the claims.

The invention claimed is:

1. A method for operating a rechargeable battery cell (2), the method comprising:
   measuring (101) a first voltage (U1) of the battery cell (2),
   comparing (102) the first voltage (U1) with a first limit voltage (Umax1),
   charging (104) the battery cell (2) if the first voltage (U1) is less than the first limit voltage (Umax1),
   measuring (106) a second voltage (U2) of the battery cell (2),
   comparing (107) the second voltage (U2) with a second limit voltage (Umax2),
   discharging (109) the battery cell (2) if the second voltage (U2) is greater than the second limit voltage (Umax2),
   wherein the first limit voltage (Umax1) is greater than the second limit voltage (Umax2).

2. The method according to claim 1, wherein
   a termination (103) of a charging of the battery cell (2) is carried out if the first voltage (U1) is greater than or equal to the first limit value (Umax1).

3. The method according to claim 1, wherein
   a termination (108) of a discharge of the battery cell (2) is carried out if the second voltage (U2) is less than or equal the second limit voltage (Umax2).

4. The method according to claim 1, wherein
   a waiting period (105) is provided between the charging process (104) and the second measurement (106) of the second voltage (U2).

5. The method according to claim 1, wherein
   the first limit voltage (Umax1) is between 4.3 volts and 4.35 volts.

6. The method according to claim 1, wherein
   the second limit voltage (Umax2) is between 4.15 volts and 4.2 volts.

7. The method according to claim 1, wherein
   the charging process (104) takes place by means of recuperation.

8. A battery control device (50), equipped to carry out the method according to claim 1.

9. A use of the battery control device (50) according to claim 8 in an electric vehicle (EV), in a hybrid vehicle (HEV) or in a plug-in hybrid vehicle (PHEV).

* * * * *